(12) United States Patent
Boetcher et al.

(10) Patent No.: US 10,827,253 B2
(45) Date of Patent: Nov. 3, 2020

(54) EARPHONE HAVING SEPARATE MICROPHONES FOR BINAURAL RECORDINGS AND FOR TELEPHONING

(71) Applicant: Sennheiser electronic GmbH & Co. KG, Wedemark (DE)

(72) Inventors: Sven Boetcher, Wedemark (DE); Kai Lange, Bielefeld (DE); Nicole Fresen, Burgdorf (DE); Hatem Röschmann-Foudhaili, Hannover (DE)

(73) Assignee: Sennheiser electronic GmbH & Co. LG, Wedemark (DE)

( * ) Notice: Subject to any disclaimer, the term of this patent is extended or adjusted under 35 U.S.C. 154(b) by 0 days.

(21) Appl. No.: 16/494,382

(22) PCT Filed: Mar. 8, 2018

(86) PCT No.: PCT/EP2018/055743
§ 371 (c)(1),
(2) Date: Sep. 16, 2019

(87) PCT Pub. No.: WO2018/166885
PCT Pub. Date: Sep. 20, 2018

(65) Prior Publication Data
US 2020/0245056 A1    Jul. 30, 2020

(30) Foreign Application Priority Data
Mar. 17, 2017    (DE) .......... 10 2017 105 767

(51) Int. Cl.
*H04R 1/10*    (2006.01)
*H04R 19/04*    (2006.01)
*H04M 1/60*    (2006.01)

(52) U.S. Cl.
CPC ........ *H04R 1/1083* (2013.01); *H04M 1/6058* (2013.01); *H04R 1/105* (2013.01);
(Continued)

(58) Field of Classification Search
CPC .... H04R 1/1083; H04R 1/1041; H04R 1/105; H04R 19/04; H04R 2201/107; H04R 2420/01; H04M 1/6058
See application file for complete search history.

(56) References Cited

U.S. PATENT DOCUMENTS 3,969,583 A    7/1976    Griese et al.
4,088,849 A    5/1978    Usami et al.
(Continued)

FOREIGN PATENT DOCUMENTS

| EP | 3174309 | 5/2017 |
|---|---|---|
| WO | WO 00/64216 | 10/2000 |
| WO | WO 2016/013733 | 1/2016 |

OTHER PUBLICATIONS

Search Report for Application No. PCT/EP2018/055743 dated May 14, 2018.

*Primary Examiner* — David L Ton
(74) *Attorney, Agent, or Firm* — Haug Partners LLP

(57) ABSTRACT

An improved earphone which has stereophonic microphones and which is better suited for connection to such a multimedia device includes two ear units to be worn in or on the ear, which each include at least one sound generator and a microphone for binaural recording of ambient sound, a microphone unit which includes at least one further microphone, an operating unit which is connected via cable to the two ear units and the microphone unit, and a connection unit as interface, which is suitable for connecting the earphone to the multimedia device. For easy handling the earphone has at least two different function modes between which switching can take place both automatically and manually.

14 Claims, 5 Drawing Sheets

(52) U.S. Cl.
CPC .......... *H04R 1/1041* (2013.01); *H04R 19/04* (2013.01); *H04R 2201/107* (2013.01); *H04R 2420/01* (2013.01)

(56) References Cited

U.S. PATENT DOCUMENTS

| | | |
|---|---|---|
| 2006/0182287 A1 | 8/2006 | Schulein et al. |
| 2010/0119077 A1* | 5/2010 | Platz ..................... A61F 11/08 |
| | | 381/72 |
| 2013/0089225 A1 | 4/2013 | Tsai |
| 2014/0126756 A1* | 5/2014 | Gauger, Jr. .......... G10K 11/178 |
| | | 381/309 |
| 2014/0307868 A1 | 10/2014 | Weis |
| 2016/0165338 A1* | 6/2016 | Benattar ................ H04R 1/406 |
| | | 381/92 |
| 2016/0192073 A1* | 6/2016 | Poornachandran ..... G10L 25/51 |
| | | 381/26 |
| 2018/0249277 A1* | 8/2018 | Voss ........................ H04S 5/00 |

* cited by examiner

EARPHONE HAVING SEPARATE MICROPHONES FOR BINAURAL RECORDINGS AND FOR TELEPHONING

The present application claims priority from International Patent Application No. PCT/EP2018/055743 filed on Mar. 8, 2018, which claims priority from German Patent Application No. DE 10 2017 105 767.6 filed on Mar. 17, 2017, the disclosures of which are incorporated herein by reference in their entirety.

FIELD OF THE INVENTION

It is noted that citation or identification of any document in this application is not an admission that such document is available as prior art to the present invention.

The invention relates to an earphone, in particular an earphone with a plurality of microphones for binaural recordings.

BACKGROUND OF THE INVENTION

The use of binaural earphones or headphones with microphones for recording stereophonic or binaural audio signals is known. The stereo audio signal can be output to another device, by means of which it can then be recorded. At the same time as the audio recording, a video can be recorded which can be synchronized with the audio recording.

Known from US 2013/0089225 A is an earphone for binaural recordings, which has two units for sound reproduction and two microphone units for detection of sound signals.

US 2006/0182287 A1 discloses an audio monitoring system, in which at least one microphone is arranged on or close to an ear of a user in order to record sound events as they are perceived by the user during normal hearing. The monitoring system also contains earphones in order to bring the sound to the ear of the user.

Known from U.S. Pat. No. 3,969,583 is a recording technique with head-mounted stereo microphones.

U.S. Pat. No. 4,088,849 discloses a headphone with a pair of converter units which each contain a microphone and a loudspeaker.

Present-day multimedia devices such as smartphones, tablets etc. frequently exhibit both a telephone function and also an audio recording and/or audio reproduction function.

US 2014/0307868 A1 describes a headphone with a microphone which can be used for speech signals for telephoning and two further microphones for ambient sound, whose signals are switched off during telephoning and output to the headset in an ambient sound mode (ambient mode).

SUMMARY OF THE INVENTION

When using known earphones with stereo microphones, it has been established that these have a reduced speech quality for the telephone function. An object of the present invention consists in providing an earphone, which has stereo microphones and which is better suited for connection to a multimedia device with telephone function and audio recording and/or audio reproduction function.

The object is solved according to the invention. According to the invention, an earphone for connection to a multimedia device which is suitable for a telephone mode and an audio recording/reproduction mode, contains two ear units each having at least one microphone for binaural recording of ambient sound and a sound generator, at least one further microphone for capturing speech of a user and a connection unit for connection of the earphone to a multimedia device. In this case, the connection unit can as desired output audio signals of the two microphones for recording ambient sound or audio signals of the further microphone for capturing speech. When the multimedia device switches into telephone mode, the earphone switches automatically into a mode in which the connection unit outputs audio signals only of the further microphone for capturing speech. However, during the telephone conversation the user can switch between this microphone for capturing speech and the two microphones for recording ambient sound. When the microphone for capturing speech is used, an active noise compensation (ANC) can be switched on automatically, wherein the two microphones for recording ambient sound deliver the compensation signal. The earphone can thus be used as a hearing/speech accessory (headset).

BRIEF DESCRIPTION OF THE DRAWINGS

Advantages and embodiments by way of example of the invention are described in greater detail hereinafter with reference to the drawings.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The invention relates to an earphone which is suitable for connection to a multimedia device which has a telephone function and at least one audio reproduction function such as, for example, a smartphone. The earphone includes two ear units to be worn in or on the ear, which each contain at least one electro-acoustic converter as a sound generator and an electro-acoustic converter as a microphone for recording ambient sound. Since these two microphones of the ear units are arranged in the immediate vicinity of the ears of the user, they can record a binaural signal which imparts a natural or authentic sound impression during reproduction via headphones or earphones. The earphone furthermore includes at least one further microphone for capturing speech of the user and as an interface, a connection unit which is suitable for connecting the earphone to the multimedia device. In this case, the earphone can, as desired, output audio signals of the two microphones for binaural recording of ambient sound or audio signals of the further microphone or a mixture of the two, via the connection unit. In this case, the earphone according to the invention has the particular advantage of each handling. For example, the earphone has at least two different function modes between which switching can take place both automatically and also manually. For manual switching between the modes, in one embodiment an operating element is provided so that the multimedia device itself is not required for this and can possibly remain stowed in a pocket or similar. Thus, the earphone according to the invention is not only easy to use because binaural audio recordings can be made without special technical knowledge but is also facilitates the operation of the multimedia device, in particular the switching from or into the telephone mode. Manual switching between modes can also be accomplished on the earphone or also via the multimedia device, e.g. by a software program.

Figure 1:
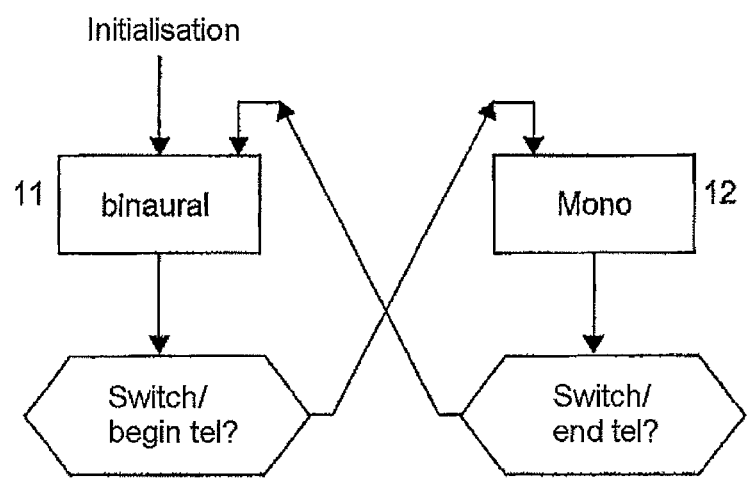
FIG. 1 shows a flow diagram of various function modes.

FIG. 1 shows a flow diagram of these different function modes of the earphone according to the invention. In one embodiment, the earphone is initially in a binaural mode 11 in which it can output via its interface the binaural signals of the microphones for recording ambient sound, which are located in the ear units. The user can change the function mode via a switching function so that the signal of the microphone for recording speech is output. In this example, this is a mono-microphone so that the second function mode 12 is a mono-mode. In one embodiment however, the microphone for capturing speech can also be a different one, e.g. a stereo microphone so that the second mode 12 is a stereo mode. The microphone for capturing speech is attached so closely to the mouth of the user when wearing that it offers a better speech quality when telephoning than the microphones located in the ear units. For example, it can be accommodated in a microphone unit.

By repeated actuation of the switching function, the binaural signal is again output. For this purpose, in one embodiment one or more switches can be provided as operating element on the earphone. The binaural mode 11 allows the realistic recording of an audio scene in the surroundings and is in particular appropriate and advantageous when the connected multimedia device includes an audio recording function. This can also be coupled to a video recording function. The second mode 12 offers a better understandability of speech, in particular in a loud environment and is principally intended for telephony. Thus, the earphone switches automatically into the second mode 12 independently of the current mode as soon as the connected multimedia device begins or accepts a telephone call. This switching of the connected multimedia device into the telephone mode can be accomplished not only directly on the multimedia device but, for example, via a switch located in the earphone. This can be attached directly to an ear unit or also to another part of the earphone, e.g. an operating part. In this case, the earphone is switched simultaneously into the second mode 12, as indicated in FIG. 1 as "begin tel." In one embodiment of the invention, after the end of the telephone call the earphone is automatically switched back again into the binaural mode 11, as indicated in FIG. 1 by "end tel." In another embodiment, the mode last used is retained and switching takes place manually or only at the beginning of a recording automatically into the binaural mode 11.

Regardless of this, in a standard reproduction mode the earphone reproduces audio signals via the sound generator in the ear units, which are received by the multimedia device via the connection unit. In this case, this can involve general audio signals such as music or a telephone conversation, additionally the transparent mode described further below.

Figure 2:
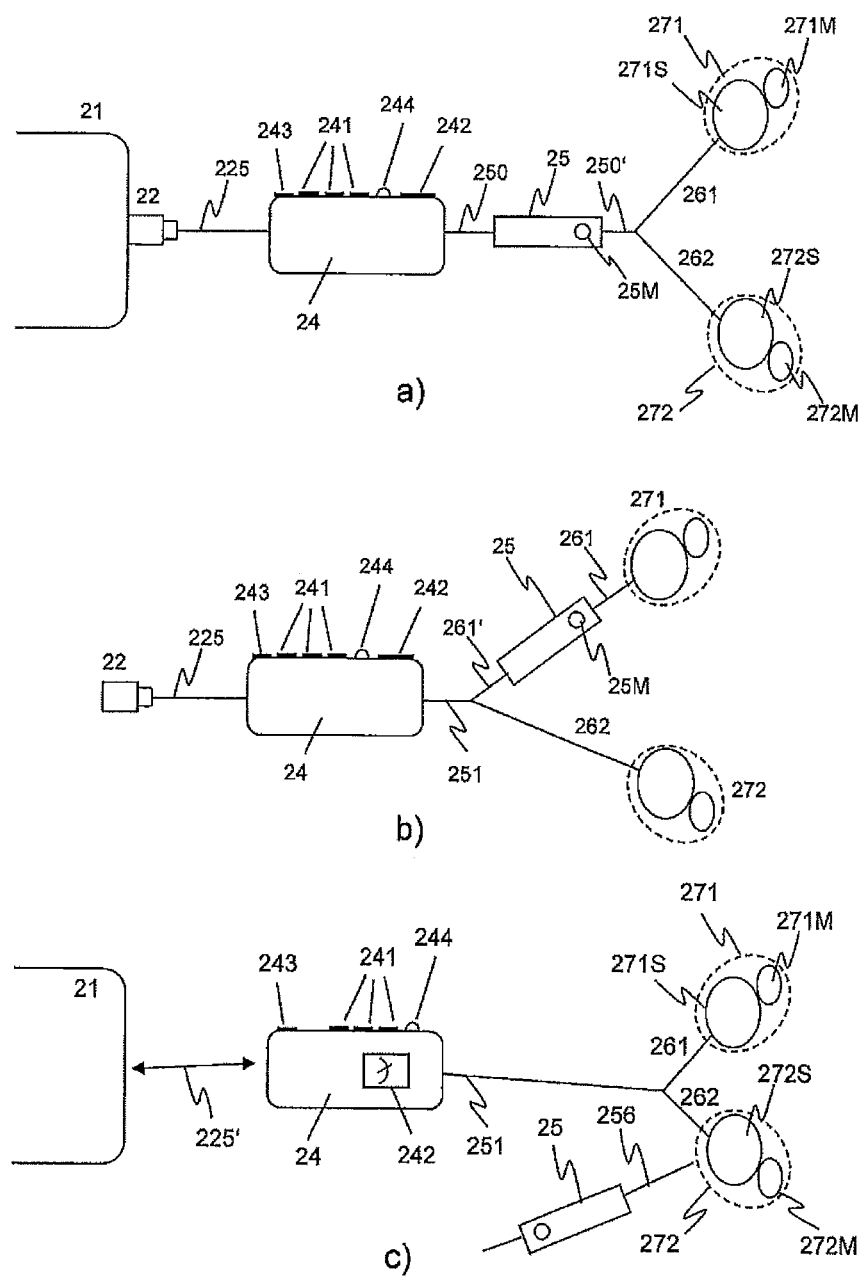
FIG. 2 shows outline views of several different embodiments.

FIG. 2 shows outline views of several different embodiments of earphones according to the invention. In principle, the earphone includes two ear units 271, 272 which each include a sound generator 271S, 272S and a microphone 271M, 272M for recording ambient sound. These microphones 271M, 272M are here connected via cables 250, 251, 261, 262 to an operating unit 24. These cables 250, 251, 261, 262 can be designated as Y cables on account of their shape. In addition, the earphone here includes a separate microphone unit 25 with a further microphone 25M. In the embodiments shown in FIGS. 2a) and b), the microphone unit 25 is located in a part of the Y cable between an ear unit 271, 272 and the operating unit 24. In another embodiment the microphone unit 25 is fastened to an ear unit, e.g. via a cable or a microphone arm (boom arm) 256, as shown in FIG. 2c).

In FIG. 2a), the microphone unit 25 is arranged in a common part 250, 250' of the Y cable between the operating unit 24 and the two ear units 271, 272. In FIG. 2b) on the other hand, the microphone unit 25 is arranged in a part 261, 261' of the Y cable which only leads to one of the ear units 271, 272. In some embodiments the microphone unit 25 only needs an electrical connection to the operating unit 24. In addition, the depicted embodiments differ in that the connection unit by means of which the operating unit 24 is connected to the multimedia device 21 either comprises a cable 225 with a plug 22 or a wireless connection 225' as in FIG. 2c). The plug can be a configurable standard plug such as, for example, an Apple "lightning" plug or a plug according to the USB standard, possibly a USB-C plug or a micro-USB plug. For a wireless connection 225' the earphone includes a transmitter and a receiver, e.g. in the operating unit 24 or in a separate element which can communicate wirelessly with the multimedia device according to a (standardized) protocol.

FIG. 2 shows the optional operating unit 24. This contains in this example three first switches 241 at least for controlling the audio reproduction function of the multimedia device 21 and for switching the multimedia device into the telephone mode. In addition, the operating unit includes a second switch 242 by means of which it is possible to switch between the first mode 11 and the second mode 12. In other words, with the switching function 242 of the second switch it can be determined manually whether the connection unit is connected to the two microphones 271M, 272M for binaural recording of ambient sound or to the further microphone in the microphone unit 25 in order to reproduce the signals thereof to the multimedia device 21. This switching is preferably possible at any time, also during the telephone mode. In FIG. 2c) the second switching function 242 is shown as an electronic unit without mechanical switches, which can be controlled from the multimedia device 21. However, the electronic second switching function 242 which can be additionally controlled by the multimedia device 21 can additionally also be controllable by a mechanical switch as shown in FIGS. 2a), b). The various features of the embodiments shown in FIG. 2 relating to the various connection units, switching functions and arrangements of the microphone unit 25 can also be combined directly with one another.

In addition, in this embodiment, the operating unit 24 includes as further switching function 243 a further switch and a light as optical display 244 of the function mode 11, 12 just selected. The further switching function 243 can also be implemented like the second switching function 242 as an electronic unit with or without mechanical switches, which can be controlled by the multimedia device 21. The optical display can be implemented as a LED or differently, e.g. as an LCD display. For example, in one embodiment the optical display only lights up when the earphone is in the second mode 12. It can therefore display both for the user and also for his surroundings whether the user or his conversation partner can hear the surroundings of the user. The further switching function 243 can switch a transparent mode (talk-through mode) on and off, in which the signal of a microphone 271M, 272M for ambient sound is connected to the sound generator 271S, 272S located in the same ear unit in each case. Thus, the user can also hear his surroundings when the ear units close the ear canal. The audio signals recorded by the microphone 271M, 272M for ambient sound can firstly be processed in a processing unit for the transparent mode. The processing unit can, for example, act as a filter or as an equalizer. Preferably such a processing unit is mounted in an ear unit or in the operating unit. The processing can take place in a completely or partially analog manner which can reduce the latency time and be more effective. Some parameters of the processing can be varied by the user. In principle, therefore at least three signal paths are provided: a first signal path comprises the microphones 271M, 272M for recording ambient sound and the connection unit. A second signal path comprises the microphone in the microphone unit 25 and the connection unit. A third signal path comprises the microphones 271M, 272M for recording ambient sound, the sound generators 271S, 272S in the ear units and an interposed processing unit. It is possible to switch between these signal paths by means of the operating unit 24. The first and/or second signal path can optionally also contain a processing unit. The processing units can preferably process audio signals in the entire audible frequency spectrum.

In one embodiment the further switching function 243 can also switch between several transparent modes. These transparent modes differ as to whether and with which amplification or attenuation the signal of the microphone 271M, 272M for ambient sound is switched to the sound generators 271S, 272S located in the same ear unit in each case.

For example, in a non-transparent mode the signals of the microphones for ambient sound are not switched to the sound generators ("off"), in a first transparent mode the signals of the microphones for ambient sound are switched to the sound generators in an attenuated manner and in a second transparent mode the signals of the microphones for ambient sound are switched to the sound generators substantially unattenuated. Thus, in the second transparent mode the user in principle hears his surroundings "naturally", i.e. as if he were not wearing any earphones. One or more further transparent modes are possible, e.g. with more or less attenuation than in the first transparent mode or with an amplification. In this case, when the audio reproduction loudness increases above a threshold value, the reproduction loudness of at least one transparent mode can also be increased.

The further switching function 243 can be executed differently, e.g. as a rocker switch with a rest position and two button positions (e.g. "upwards" and "downwards", in steps or continuously) with corresponding software or as a multistage switch with several rest positions.

Figure 3:
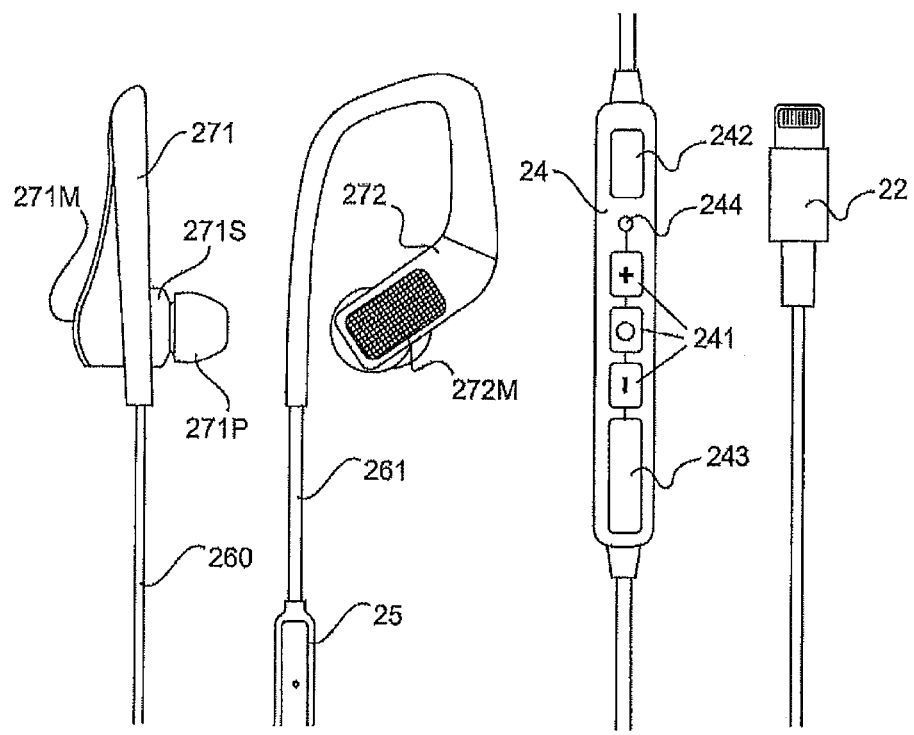
FIG. 3 shows views of exemplary components of the earphone.

FIG. 3 shows views of exemplary components of the earphone according to the invention in one embodiment. In this case, each of the ear units 271, 272 includes an ear fitting piece 271P which can be fastened on or in the ear and through the opening whereof the sound of the sound generator 271S can be input into the ear canal. Located on the opposite side is a microphone 271M, 272M which can record the respective ambient sound. Each ear unit 271, 272 is connected to a cable 260, 261. In this example, the microphone unit 25 is integrated in one of these cables according to FIG. 2b). In this case, the microphone unit 25 can be integrated in the cable to the left or to the right ear unit. In one embodiment, two microphone units 25 can be used which can be integrated in the two supply cables for the ear units 271, 272.

FIG. 3 also shows a view of an exemplary operating unit 24 with the first switch 241, the switch for the second switching function 242, the display 244 and the further switch 243 for the further switching function. In this example, the further switch 243 for example comprises a rocker switch or rocker push-button with a rest position and two button positions. Shown on the right in FIG. 3 is the connection unit with a plug 22 which in this example is an Apple "lightning" plug.

Figure 4:
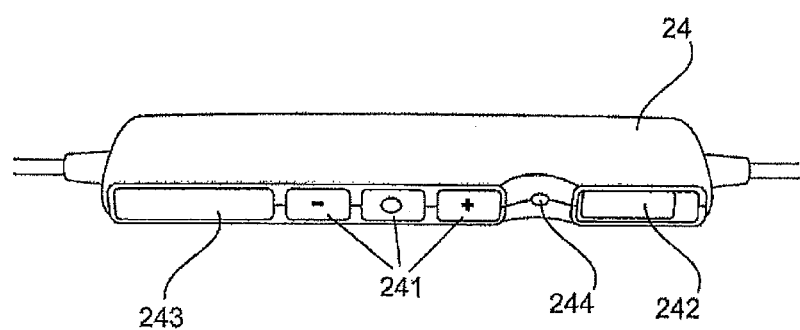
FIG. 4 shows a view of an exemplary operating unit.

In the view of an exemplary operating unit shown as an embodiment in FIG. 4 the second switching function 242 is designed as a pushbutton or as a slide push switch, i.e. as a push-button which can be actuated by lateral sliding. Each actuation of the push-button 242 switches to and fro between the first mode 11 and the second mode 12. The design as a slide push-button makes it difficult to actuate inadvertently. In this example, the first switches 241 include switches each designated with "+" and "−", e.g. for regulating the loudness, for menu guidance or for selection of audio files to be reproduced on the multimedia device, and a switch designated with "o" which can be used, for example, for switching on and off the telephone mode and/or for actuating the selection of menu points or audio files to be reproduced on the multimedia device.

Figure 5:
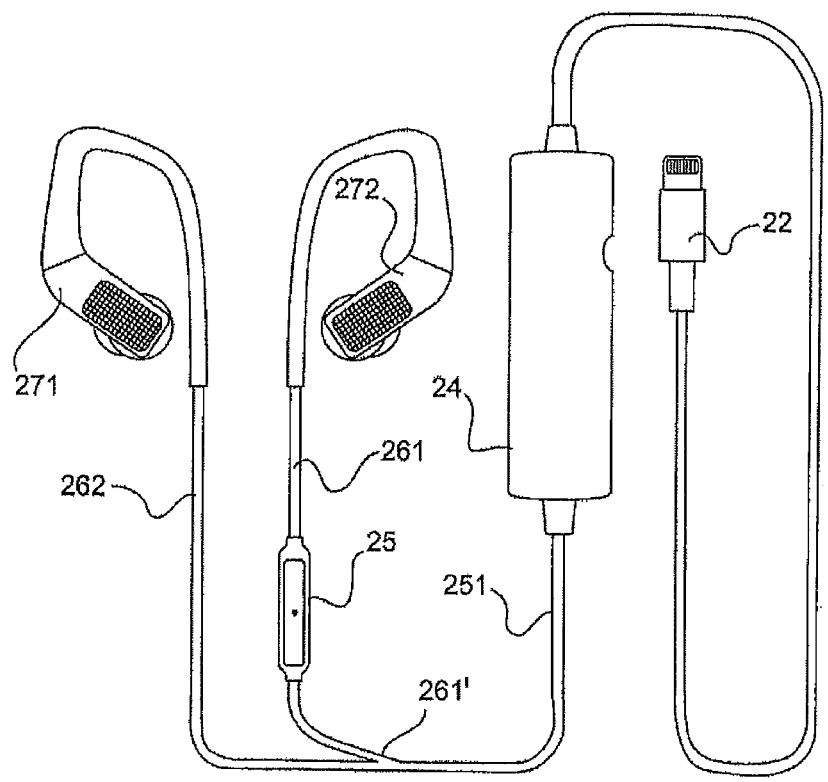
FIG. 5 shows an exemplary overall view of the earphone in one embodiment.

FIG. 5 shows an exemplary overall view of one embodiment of the earphone with the individual components described above. In this case, the operating element 24 can also be arranged differently so that the luminous display 244 and the second switch 241 are located on the end of the operating element facing the ear unit.

Figure 6:
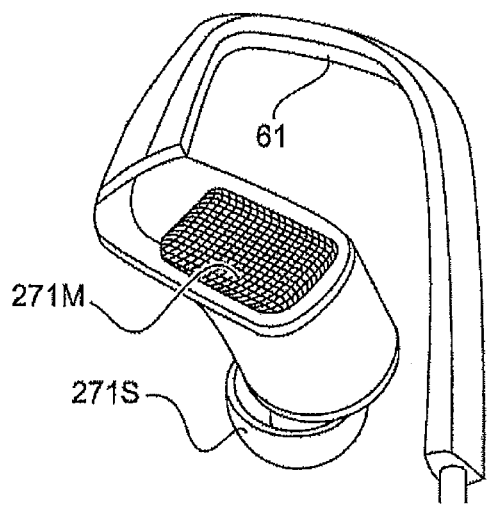
FIG. 6 shows a view of an exemplary ear unit.

FIG. 6 shows a view of an exemplary ear unit. The ear units 271, 272 in this embodiment include fastening clips 61 which are suitable for wearing over the ear to fasten the respective ear unit on the ear. The microphone 271M for recording ambient sound is mounted under a wire mesh which protects the microphone from wind and damage or accidental contact. In one embodiment, the microphone has a broad directional characteristic up to 180°, which is particularly advantageous for recordings of the surroundings.

In addition to the two modes 11, 12 shown in FIG. 1, in one embodiment the connection unit can also be connected to all three microphones 271M, 272M, 25M. In this case, the binaural signal of the two microphones 271M, 272M of the ear units (binaural microphones) and the signal of the microphone 25M from the microphone unit 25 are superposed. Preferably however at the beginning of a telephone conversation, initially the unit is always automatically switched into the second mode 12. In addition, there can be a mode in which audio signals of the microphone 25M for capturing speech are output so that they can be used for the telephone mode of the multimedia device whereas at the same time audio signals of the microphones 271M, 272M for recording ambient sound are output separately so that they can be used for an audio recording mode of the multimedia device. In this mode, the voice of the user (making the telephone call) does not disturb the recording or only slightly disturbs the simultaneously running audio recording because it is only weakly recorded via the microphones 271M, 272M. Nevertheless, the voice is effectively captured by the microphone 25M for the telephone mode. However, the microphone 25M only capture a small amount of ambient sound. In one embodiment the voice of the user recorded by the microphone 25M, for example, can be subtracted partially or predominantly from the ambient sound recorded by the microphones 271M, 272M or conversely. Alternatively, the audio signals of the microphones 271M, 272M for recording ambient sound can be used as input signals of an automatic noise compensation (ANC). As a result, ambient noise can be reduced or eliminated from the speech signal of the microphone 25M for the telephone mode and also from the signal reproduced via the sound generator. In one embodiment, the microphone 25M and the active noise compensation are switched on automatically when accepting a telephone call or when switching into the telephone mode.

The multimedia device can be configured so that its internal microphones and/or loudspeakers are switched off when connecting the earphone. This switch-off can be controlled by control signals which the earphone outputs via its connection unit. The same applies for a possible activation of the internal microphones and/or loudspeakers of the multimedia device from the earphone.

The earphone according to the invention can also include one or more analog-digital converters (ADC) for outgoing signals and/or one or more digital-analog converters (DAC) for incoming signals, e.g. in the connection unit or the processing unit. Also a delay unit can optionally be provided which, for example, produces an offset for synchronization of the output audio data with a video.

Optionally all the connections implemented by cable in the above description can also be executed in a wireless manner. In this case, the earphone can, for example, consist of two parts, namely two separate wireless ear units 271, 272. The microphone 25M, the operating unit 24 and the connection unit can be integrated in one of the ear units, wherein however the microphone 25M is mounted somewhat offset in such a manner that it can readily capture the voice of the user. In one embodiment, the earphone consists of three parts, e.g. with an additional wireless microphone unit 25, which includes at least the microphone 25M for capturing speech and can be worn closer to the mouth of the user than the ear units. The wireless microphone unit 25 can, however, also include one or more operating units, displays or the connection unit.

In one embodiment of the invention, a method for operating a microphone or headset includes the steps: recording ambient sound by means of two first microphones which are fastened to ear units 271, 272 of an earphone, outputting the binaural signals recorded by the first microphone via an interface to a connected multimedia device and switching the connected multimedia device into a telephone mode by means of a switching function on the earphone, wherein the switching function additionally has the effect that instead of the binaural signals recorded by the first microphone, output signals of a second microphone 25M are output via the interface to the connected multimedia device. The second microphone is also part of the earphone but mounted closer to the mouth of the user than the first microphones. By means of a further switching function on the earphone, the user can also switch over during the telephone mode so that the signals of the first microphones are output via the interface or used for active noise compensation. The connected multimedia device 21 can, for example, record, process and/or store the signal.

With the earphone according to the invention, one or more of the following operating scenarios mentioned as an example are possible. In one operating mode audio signals from the multimedia device are reproduced via the sound generators, e.g. music, and the microphones are not used, i.e. the transparent mode is switched off. Upon actuation of the third switching function 243, a first transparent mode is switched on in which, in addition to the audio signals from the multimedia device, the user additionally hears the surroundings but attenuated. Upon actuating the third switching function 243 again, a second transparent mode is switched on in which the user not only hears the audio signals from the multimedia device but also hears his own surroundings in original loudness (i.e. transparent). The transparent modes can also be operated without audio signals from the multimedia device so that, for example, in the first transparent mode in a very loud surroundings, the user only hears this attenuated. This mode can therefore be used, for example, in a very loud concert as hearing protection, in particular when the ear unit closes the ear canal. In the second transparent mode, when the user interrupts the reproduction of music in order to speak with another person, he can keep the earphones in the ears and nevertheless hear the person in original loudness. Optionally in one embodiment it is also possible to regulate the loudness of the audio reproduction and/or the transparent mode separately. For example, the two loudness values can be programmed or set separately via the multimedia device or directly via the operating unit 24. Thus, the user can reduce the loudness of the audio reproduction without the reduction in the loudness of the reproduction having an effect on the transparent mode so that the music can still run during the conversation with low loudness. In addition, at least in the second transparent mode it is possible that the user as a road user can telephone and nevertheless at the same time hear traffic noise, warning signals etc. from his surroundings. This increases the road safety. In one embodiment it is also possible to jointly regulate the loudness of the audio reproduction and the transparent mode. For example, when increasing the loudness of the audio reproduction, the loudness of the transparent mode can also be increased automatically. In one embodiment, it is possible to program one or more parameters of the earphone, e.g. the attenuation of the first transparent mode, the reproduction loudness(es), etc. from the multimedia device, e.g. via an application software (App.). In this case, parameters of the binaural microphone or the binaural mode and parameters of the reproduction, in particular parameters of the transparent mode, can be set independently of one another. Thus, for example, the user who is telephoning as a road user, can set the loudness with the traffic noise to penetrate to him. The transparent mode is, for example, advantageous for DJs who wish to hear simultaneously the music of their surroundings and other music via headphones and therefore traditionally only use one earphone of a headphone. With the transparent mode it is possible to hear both the surroundings and also the music with both ears. This can advantageously be used for "augmented reality" scenarios.

In one operating mode the user makes a video or audio recording by means of the multimedia device. In this case, according to the first mode 11 the audio signals of the binaural microphones are transmitted to the multimedia device, e.g. in order to underlay the recorded video with authentic (binaural) ambient sound. At the same time, the user can hear his surroundings when a transparent mode is switched on. If a telephone conversation exists simultaneously (see below), the binaural ambient sound can also be transmitted in one or more modes to the other participant. In this operating mode it is also advantageously possible to switch the transparent mode on/off or switch between the different transparent modes for the simultaneous reproduction via the sound generators. To this end, the third switching function 243 can be used, as described above. In addition, with the second switching function 242 the user can switch on the microphone 25M for capturing the voice, e.g. in order to comment on the video during the recording. In this case, the binaural microphones can optionally be attenuated in a step-wise or continuous manner or switched off.

Independently of the selected transparent mode, when switching the multimedia device into the telephone mode, the microphone located in the microphone unit 25 and therefore the second mode 12 is switched on, i.e. the signals of this microphone are relayed to the multimedia device. In one embodiment, in this case the signals of the binaural microphones are initially not relayed to the multimedia device. During the telephone call however, the user can switch into the first mode 11 with the second switching function 242 so that the conversation partner can also hear the surroundings recorded by the binaural microphones. This also applies when the user makes video recordings during the telephone call and sends them to the conversation partner. Preferably in this mode the microphone signals are mixed at least during the telephone call so that the conversation partner also hears the voice of the user recorded by the microphone 25M located in the microphone unit 25. This can be attenuated or accentuated compared with the binaural ambient sound. The user can set the mixing ratio, e.g. via an App on the multimedia device. The user himself hears, for example, the voice of his conversation partner mixed with his own ambient sound. Alternatively in another mode the ambient sound can also be filtered out by active noise compensation, wherein the ambient sound is recorded by the binaural microphones 271M, 272M. This mode can be selected automatically when switching the multimedia device into the telephone mode.

In another exemplary embodiment, the microphone signals are switched into a semi-transparent mode when switching the multimedia device into the telephone mode so that the user hears not only his conversation partner but also his own attenuated surroundings via the sound generators 271S, 272S. The conversation partner can hear a mixture of both components in the same or a different weighting, e.g. predominantly the voice of the user. Here also the user can set the mixing ratio, e.g. via an App.

The invention enables the user to immediately hear the audio signal for a recording or immediately assess its audio quality. The positioning of the binaural microphones directly on the ear canal is advantageous since the earpiece guides the sound directly thereto.

Figure 7:
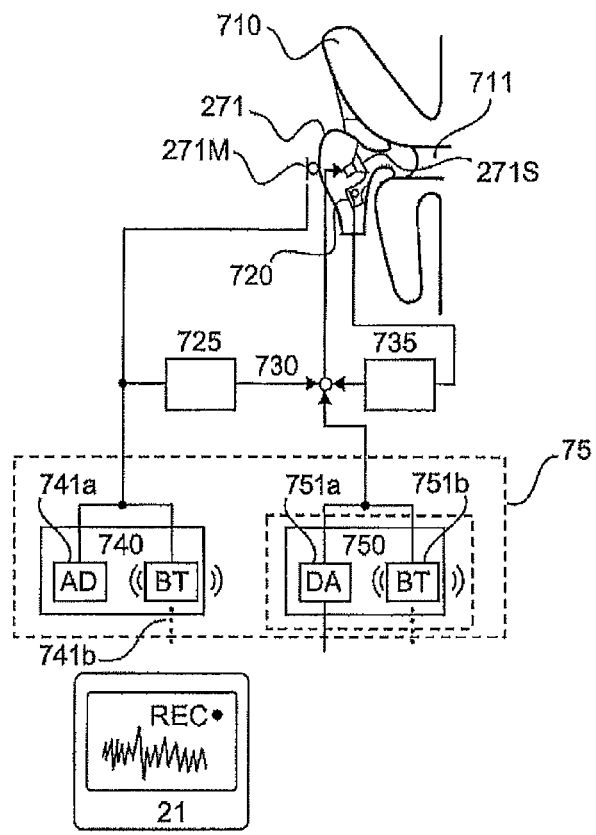
FIG. 7 shows a schematic view of an earphone with ANC.

As already mentioned, an active noise compensation (active noise cancellation, ANC) is optionally also possible. In one exemplary embodiment, FIG. 7 shows a schematic view of one side of an earphone with ANC. In this case, the signals of the microphone 271M for recording ambient sound are used. By phase-inverse reproduction via the sound generator 271S, the perturbing ambient noise in the ear canal 711 is compensated. In this case, the microphone 271M for recording ambient sound enables an open control (feed-forward ANC). A processing unit 725 generates the compensation signal. In an improved design, the ear unit 271 includes a further microphone 720 on the side facing the ear canal 711 and a processing unit 735. This enables a closed control loop (feed-back ANC). The inner microphone 720 in this case captures the superposition of sound produced by the sound generator 271S with interfering sound which has penetrated into the ear canal 711. The processing unit 735 is then designed as a regulator whose aim is to make the captured superposition zero. The regulator is a transmission filter whose transmission function is designed for this aim.

In addition, the occlusion effect can be reduced with the aid of the inner microphone 720. The processing unit 735 acts in this case as an occlusion-reducing unit and/or ANC unit. The occlusion effect or shutter effect is produced by closure of the ear canal with an earplug or an earphone. When a person speaks, the vocal chords produce vibrations which propagate in the skull and also set the ear canal in vibration so that the ear canal emits sound to the surroundings. Without an earplug, this sound leaves the ear canal and the noise produced in the ear is perceived as natural sound pattern. If the ear canal is closed however, the sound waves emitted by the ear canal are reflected at the earplug or earphone and returned into the ear canal and thus to the eardrum so that the user hears the returned sound. This effect is designated as occlusion effect. It falsifies the sound pattern produced and is therefore perceived as unpleasant. The processing unit 735 is designed so that the sound captured by the inner microphone 720 is reduced. This also relates to the case when the sound captured by the inner microphone 720 is a superposition of the sound generated by the sound generator 271S with the sound emitted by the ear canal of a speaking user. If this superposition is therefore regulated to zero by the processing unit 735, the noise emitted by the ear canal 711 is then compensated at the location of the microphone 720 by the sound emitted by the sound generator 271S. Thus, no sound occurs at the location at which the sound coming from the ear canal could be reflected. Thus no sound is returned and the occlusion effect does not occur.

In the case of active noise compensation, ambient sound which can reach the ear drum despite the sealed ear canal is compensated by counter pressure in the ear canal. To this end, a summation unit 730 can superpose correspondingly processed signals of the processing unit 725 from the outer microphone 271M, the processing unit 735 from the inner microphone 720 and/or a signal to be reproduced from an external audio source and thereby produce only the signal to be reproduced in the ear canal. FIG. 7 shows as an example, an output unit 740 which includes an analog-digital converter 741a and an optional wireless transmitter 741b. Optionally the earphone can also include an input unit 750 with a digital-analog converter 751a and an optional wireless receiver 751b. The transmitter 741b and the receiver 751b are used for wireless communication with the multimedia device 21. The other side of the earphone is constructed correspondingly.

Figure 8:
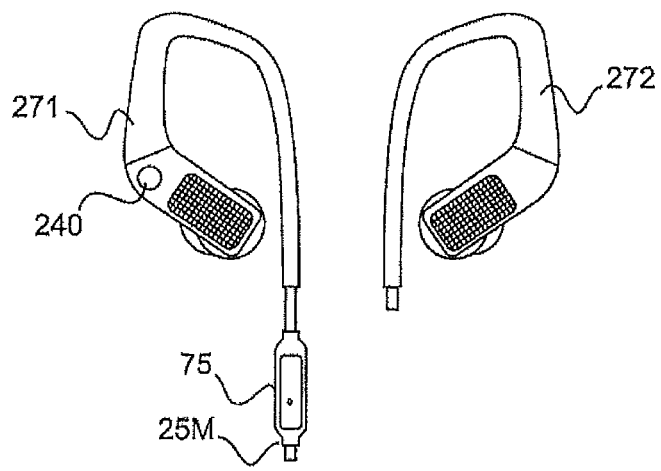
FIG. 8 shows an exemplary overall view of a wireless embodiment.

FIG. 8 shows a two-part embodiment of the earphone with two ear units 271, 272, which each include at least one sound generator and a microphone for recording ambient sound and a connection unit 75 for wireless connection to a multimedia device. The microphone 25M for capturing the voice of a user is integrated in the connection unit 75. In this example, the ear units additionally include one or more operating elements 240, e.g. for the switching functions 241, 242 described above.

The invention can be used for earphones, headsets and similar devices which are suitable both for audio reproduction and also for binaural audio recording and also for telephoning.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. Earphone for connection to a multimedia device configured for a telephone mode and an audio recording/reproduction mode, wherein the earphone includes:
   two ear units wherein each ear unit includes at least one sound generator and a microphone for recording ambient sound at respectively one ear of a user;
   at least one further microphone for capturing speech of the user; and
   a connection unit configured for connecting the earphone to the multimedia device;
   wherein the connection unit is configured to, as desired and as can be set by the user, output either audio signals of the two microphones for binaural recording of ambient sound to the multimedia device or output audio signals of the further microphone for capturing speech to the multimedia device, and
   wherein when the multimedia device switches into the telephone mode, the earphone automatically switches into a mode in which the connection unit outputs a mono signal based on audio signals of the at least one further microphone.

2. The earphone according to claim 1,
   wherein the earphone can be operated in an active noise compensation (ANC) mode for ANC,
   wherein the two microphones for recording ambient sound are used in the ANC mode, and
   wherein the earphone automatically switches into an ANC mode when the multimedia device switches into the telephone mode.

3. The earphone according to claim 2,
   wherein the two ear units each include another microphone on the side facing the ear, which is also used in the ANC mode.

4. The earphone according to claim 1,
   wherein the ear units are each connected to a cable and the microphone for capturing speech of the user is arranged in one of the cables.

5. The earphone according to claim 1,
   wherein the connection unit comprises a cable and a plug.

6. The earphone according to claim 1,
   wherein the connection unit comprises a transmitter and a receiver for a wireless connection to the multimedia device.

7. The earphone according to one of claim 1,
   wherein in at least one further operating mode the connection unit is configured to output audio signals from the two microphones and the at east one further microphone.

8. The earphone according to one of claim 1,
   wherein the at least one further microphone for capturing speech of the user is located in a microphone unit,
   wherein the earphone further includes an operating unit connected, via a cable, to the two ear units and the microphone unit,
   wherein the operating unit includes one or more first switches at least for switching the multimedia device into the telephone mode and a second switching function which can switch between the mode in which the connection unit outputs the mono signal based on audio signals of the at least one further microphone for capturing speech of the user,and another mode in which the connection unit outputs audio signals of the two microphones for binaural recording of ambient sound.

9. The earphone according to claim 8,
   wherein the second switching function is a button to be actuated by lateral sliding.

10. The earphone according to claims 1,
    wherein the earphone further includes a switching function configured to switch between several transparent modes, and
    wherein the transparent modes differ in whether and with which amplification or attenuation of the audio signal of at least one of the two microphones for binaural recording of ambient sound is switched to the sound generator located in each case in the same ear unit.

11. The earphone according to claim 10,
    wherein in a non-transparent mode the audio signals of the two microphones for binaural recording of ambient sound are not switched to the sound generators,
    wherein in a first transparent mode the audio signals of the two microphones for binaural recording of ambient sound are switched to the sound generators in an attenuated manner and
    wherein in a second transparent mode the audio signals of the microphones for binaural recording of ambient sound are switched to the sound generators in a substantially undamped manner.

12. The earphone according to claim 10,
    wherein when an audio reproduction loudness increases above a threshold value, the audio reproduction loudness of at least one transparent mode is increased.

13. The earphone according to claim 1,
    wherein after the end of a telephone conversation, the connection unit automatically outputs audio signals of the two microphones for binaural recording of ambient sound.

14. The earphone according to claim 1,
    wherein the earphone further includes an optical display which displays whether the earphone is in a different mode in which the connection unit outputs audio signals of the two microphones for binaural recording of ambient sound or in the mode in which the connection unit outputs the mono signal based on audio signals of the at least one further microphone for capturing speech of the user.

* * * * *

UNITED STATES PATENT AND TRADEMARK OFFICE
CERTIFICATE OF CORRECTION

PATENT NO. : 10,827,253 B2  
APPLICATION NO. : 16/494382  
DATED : November 3, 2020  
INVENTOR(S) : Sven Boetcher et al.

Page 1 of 1

It is certified that error appears in the above-identified patent and that said Letters Patent is hereby corrected as shown below:

(73) Under Assignee  
Please correct the Assignee to read:  
--Sennheiser electronic GmbH & Co. KG-- instead "Sennheiser electronic GmbH & Co. LG"

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*